(12) United States Patent
Hiratani et al.

(10) Patent No.: US 8,946,354 B2
(45) Date of Patent: Feb. 3, 2015

(54) METHOD FOR PRODUCING POLYMER PARTICLES

(75) Inventors: Takayuki Hiratani, Tokyo (JP);
Shinnosuke Koji, Yokohama (JP);
Kazumichi Nakahama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 183 days.

(21) Appl. No.: 13/432,155

(22) Filed: Mar. 28, 2012

(65) Prior Publication Data

US 2012/0252974 A1    Oct. 4, 2012

(30) Foreign Application Priority Data

Mar. 31, 2011  (JP) ................. 2011-078407
Apr. 19, 2011  (JP) ................. 2011-093240
Nov. 1, 2011   (JP) ................. 2011-240454

(51) Int. Cl.
*C08C 19/14*     (2006.01)
*C08F 2/18*      (2006.01)

(52) U.S. Cl.
CPC ....................... *C08F 2/18* (2013.01)
USPC ............. 525/356; 525/358; 516/53; 516/77

(58) Field of Classification Search
USPC ............................. 516/53, 77; 525/356, 358
See application file for complete search history.

(56) References Cited

FOREIGN PATENT DOCUMENTS

JP    09-043909 A    2/1997
JP    2006-221203 A  8/2006

OTHER PUBLICATIONS

Kostansek, E.; Kirk-Othmer Encyclopedia of Chemical Technology, 2003, p. 113-133.*
Adam Limer, Alex Heming, Ian Shirley, and David Haddleton, European Polymer Journal, 2005, vol. 41, pp. 805-816, Living radical polymerisation in heterogeneous conditions-suspension polymerisation.
John D. Biasutti, Thomas P. Davis, Frank P. Lucien, and Johan P. A. Heuts, Journal of Polymer Science: Part A: Polymer Chemistry, 2005, vol. 43, pp. 2001-2012, Reversible Addition-Fragmentation Chain Transfer Polymerization of Methyl Methacrylate in Suspension.
Patrick Lacroix-Desmazes, Romain Severac, and Bernard Boutevin, Macromolecules, 2005, vol. 38, pp. 6299-6309, Reverse Iodine Transfer Polymerization of Methyl Acrylate and n- Butyl Acrylate.
Jeff Tonner, Patrick Lacroix-Desmazes, and Bernard Boutevin, Macromolecules, 2007, vol. 40, pp. 186-190, Controlled Radical Polymerization of Styrene by Reverse Iodine Transfer Polymerization (RITP) in Miniemulsion: Use of Hydrogen Peroxide as Oxidant.

* cited by examiner

*Primary Examiner* — Robert Jones, Jr.
(74) *Attorney, Agent, or Firm* — Canon USA, Inc. IP Division (57) ABSTRACT

A method for producing polymer particles includes a preparation step for preparing a first oily liquid containing an oily olefin monomer, a radical polymerization initiator, and an iodine molecule, a synthesis step for obtaining a second oily liquid containing at least an iodine compound produced by a reaction between a radical generated by cleavage of the radical polymerization initiator and the iodine molecule in the first oily liquid, a suspension step for obtaining an oil droplet of the second oily liquid by suspending the second oily liquid in water, and a polymerization step for polymerizing the oily olefin monomer in the oil droplet.

5 Claims, 4 Drawing Sheets

-R₁, -R₂: HYDROCARBON GROUP SUCH AS ALKYL GROUP, ALKENYL GROUP, ALKYNYL GROUP, ARYL GROUP, OR ALKYL GROUP HAVING FUNCTIONAL GROUP

US 8,946,354 B2

METHOD FOR PRODUCING POLYMER PARTICLES

BACKGROUND OF THE INVENTION

1. Field of the Invention

The present invention relates to a method for producing polymer particles.

2. Description of the Related Art

Polymer particles are produced by various polymerization methods such as suspension polymerization, emulsion polymerization, and precipitation polymerization. Among these polymerization methods, suspension polymerization is industrially widely used as, for example, a method for producing a polymerized toner because a functional substance such as a coloring material can be easily included in polymer particles.

Recently, the area of study regarding a technique for controlling the molecular weight of polymer particles has been activated. For example, a method has been reported in which living radical polymerization such as atom transfer radical polymerization or reversible addition-fragmentation chain transfer polymerization is combined with suspension polymerization (Adam Limer, Alex Heming, Ian Shirley, and David Haddleton, European Polymer Journal, 2005, Vol. 41, pp. 805-816 (Non-Patent Literature 1), and John D. Biasutti, Thomas P. Davis, Frank P. Lucien, and Johan P. A. Heuts, Journal of Polymer Science: Part A: Polymer Chemistry, 2005, Vol. 43, pp. 2001-2012 (Non-Patent Literature 2)). However, from the standpoint of problems of, for example, a remaining catalyst, safety and sanitation, and the cost, at present, it is difficult to industrially use many of such living radical polymerization methods.

A method in which a polymerization control agent such as a chain transfer agent or a polymerization inhibitor is used is known as a method for industrially controlling the molecular weight. However, a significant difference in the molecular weight may be caused or the polymerization conversion rate may be significantly decreased depending on a slight difference in the amount of polymerization control agent used (Japanese Patent Laid-Open No. 09-043909 (Patent Literature 1) and Japanese Patent Laid-Open No. 2006-221203 (Patent Literature 2)). Although the molecular weight can also be controlled by changing the amount of polymerization initiator or the polymerization temperature, such a method has many problems in terms of the cost and safety for the purpose of obtaining polymer particles having a low molecular weight, for example.

As a method capable of easily controlling the molecular weight at a low cost, Patrick Lacroix-Desmazes, Romain Severac, and Bernard Boutevin, Macromolecules, 2005, Vol. 38, pp. 6299-6309 (Non-Patent Literature 3) proposes a method in which suspension polymerization and reverse iodine transfer polymerization are combined.

Jeff Tonner, Patrick Lacroix-Desmazes, and Bernard Boutevin, Macromolecules, 2007, Vol. 40, pp. 186-190 (Non-Patent Literature 4) discloses that, in a process of producing polymer particles in which suspension polymerization and reverse iodine transfer polymerization are combined, molecular-weight controllability and the polymerization conversion rate can be improved by adding hydrogen peroxide and hydrochloric acid to an aqueous phase.

SUMMARY OF THE INVENTION

The inventors of the present invention found that, in the method disclosed in Non-Patent Literature 3, in the case where suspension polymerization and reverse iodine transfer polymerization are combined, iodine molecules leak into an aqueous phase, resulting in a significant decrease in molecular-weight controllability and the polymerization conversion rate.

In the method disclosed in Non-Patent Literature 4, oxygen generated by thermal decomposition of hydrogen peroxide inhibits a polymerization reaction, and therefore, the polymerization conversion rate is fundamentally insufficient. Furthermore, since this method is suspension polymerization under a strong acid condition, dispersion stability of polymer particles may be impaired.

The present invention provides a method for producing polymer particles in which suspension polymerization and reverse iodine transfer polymerization are combined, and both molecular-weight controllability and a high polymerization conversion rate can be satisfactorily achieved.

A method for producing polymer particles includes a preparation step for preparing a first oily liquid containing an oily olefin monomer, a radical polymerization initiator, and an iodine molecule; a synthesis step for obtaining a second oily liquid containing at least an iodine compound produced by a reaction between a radical generated by cleavage of the radical polymerization initiator and the iodine molecule in the first oily liquid; a suspension step for obtaining an oil droplet of the second oily liquid by suspending the second oily liquid in water; and a polymerization step for polymerizing the oily olefin monomer in the oil droplet. According to the present invention, it is possible to provide a method for producing polymer particles in which suspension polymerization and reverse iodine transfer polymerization are combined, and both molecular-weight controllability and a high polymerization conversion rate can be satisfactorily achieved.

Further features of the present invention will become apparent from the following description of exemplary embodiments with reference to the attached drawings.

DESCRIPTION OF THE EMBODIMENTS

A method for producing polymer particles according to an embodiment of the present invention includes a preparation step for preparing a first oily liquid containing an oily olefin monomer, a radical polymerization initiator, and an iodine molecule; a synthesis step for obtaining a second oily liquid containing at least an iodine compound produced by a reaction between a radical generated by cleavage of the radical polymerization initiator and the iodine molecule in the first oily liquid; a suspension step for obtaining an oil droplet of the second oily liquid by suspending the second oily liquid in water; and a polymerization step for polymerizing the oily olefin monomer in the oil droplet.

The method for producing polymer particles according to an embodiment of the present invention is a method that uses reverse iodine transfer polymerization. First, reverse iodine transfer polymerization will be described. Reverse iodine transfer polymerization is living radical polymerization characterized by using iodine molecules. Reverse iodine transfer polymerization is described in, for example, Non-Patent Literature 3. A polymerization reaction in reverse iodine transfer polymerization is divided into an induction period induced in the initial stage of the polymerization reaction and a growth period induced in the middle and late stages of the polymerization reaction. In the induction period, an iodine compound is produced by a chemical reaction between a radical generated by cleavage of a radical polymerization initiator and an iodine molecule. In the growth period, polymer compounds are produced by a chain reaction of a monomer with intervention of the iodine compound and the radical polymerization initiator.

Next, reverse iodine transfer polymerization will be specifically described with reference to FIGS. 3A and 3B and FIG. 4.

Figure 3A:
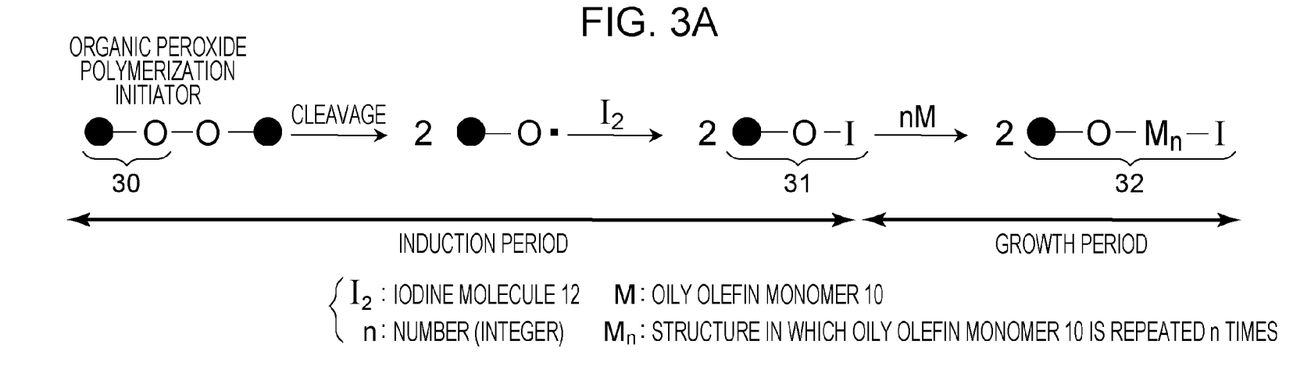
FIGS. 3A and 3B are drawings each illustrating a production mechanism of an iodine compound in reverse iodine transfer polymerization.
Figure 3B:
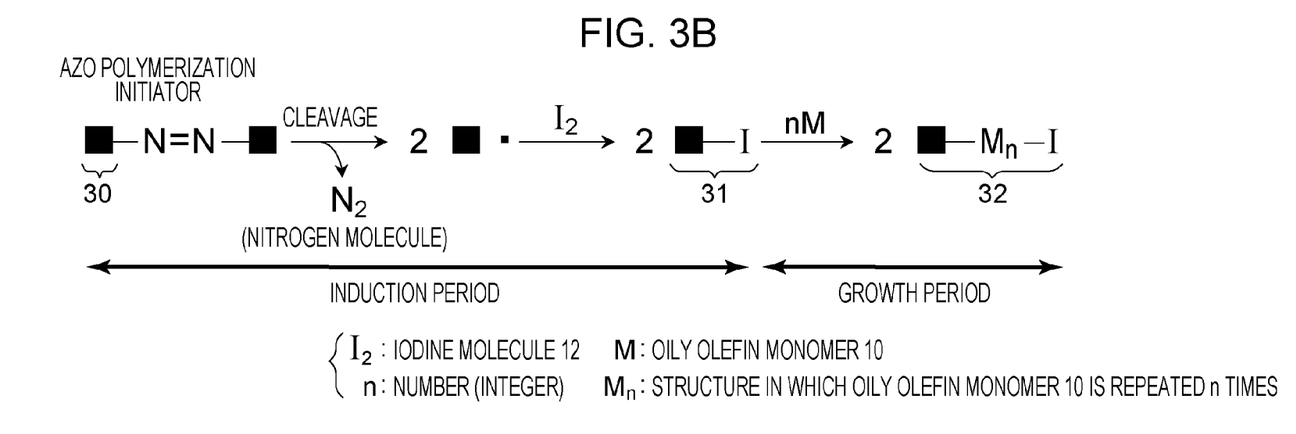

FIGS. 3A and 3B are drawings each illustrating a production mechanism of an iodine compound in reverse iodine transfer polymerization. As illustrated in FIGS. 3A and 3B, an iodine compound 31 is produced by a reaction between radicals each having a chemical structure of a residue 30 generated by cleavage of a radical polymerization initiator 11 and an iodine molecule ($I_2$). That is, the iodine compound 31 has a chemical structure in which an iodine atom is directly bonded to the residue 30. However, the iodine compound may have a chemical structure in which an iodine atom is directly bonded to a derivative of the residue 30 generated by further cleavage of a radical having the chemical structure of the residue 30 as long as the object of this embodiment can be achieved. Furthermore, an oligomer 32 in which an oily olefin monomer 10 is interposed between the residue 30 and an iodine atom may be mixed as an iodine compound 14. FIG. 3A illustrates a case where an organic peroxide polymerization initiator is used as the radical polymerization initiator, and FIG. 3B illustrates a case where an azo polymerization initiator is used as the radical polymerization initiator.

Figure 4:
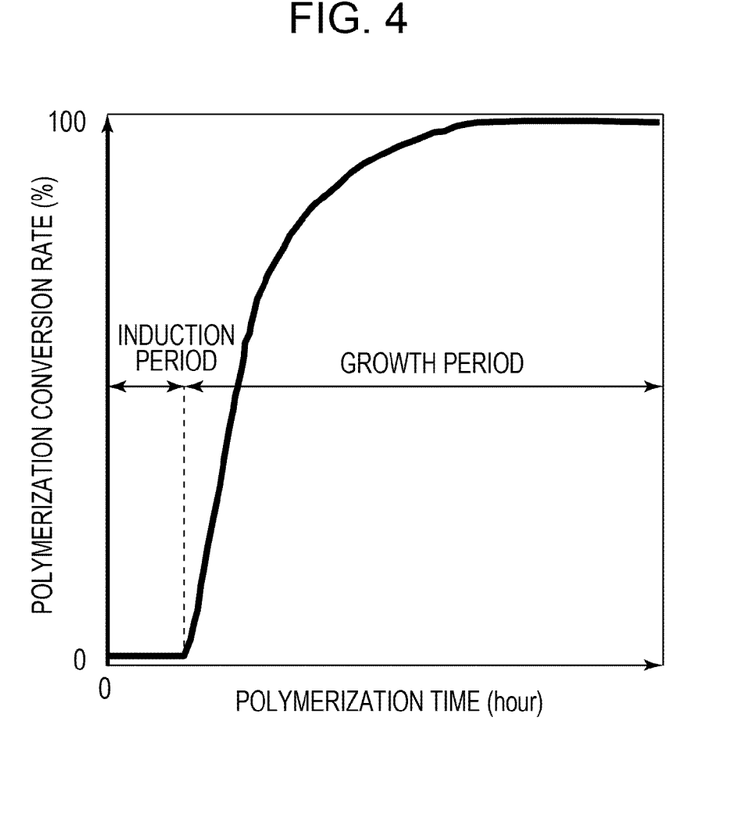
FIG. 4 is a graph showing a typical relationship between the polymerization conversion rate and the polymerization time in reverse iodine transfer polymerization.

FIG. 4 is a graph showing a typical relationship between the polymerization conversion rate and the polymerization time in reverse iodine transfer polymerization. As shown in FIG. 4, reverse iodine transfer polymerization is characterized in that the polymerization conversion rate hardly changes in the induction period, and increases in the growth period with the increase in the polymerization time.

The molecular weight of a polymer compound obtained by ideal reverse iodine transfer polymerization (in the case where the polymerization conversion rate is 100%) depends on the amount of iodine molecules charged as represented by formula (1):

(Molecular weight of polymer compound)=[(Weight of monomer charged)/{2×(The number of iodine molecules charged)}]+(Mass number of residue of radical polymerization initiator)+(Mass number of iodine atom)   Formula (1)

The polymer particles in this embodiment are a form of particles obtained when the polymer compound is formed into particles by a limitation of interfacial energy in the suspension step and the polymerization step for suspension polymerization. That is, the term "molecular weight of a polymer compound" and the term "molecular weight of polymer particles" used herein represent the same concept.

A problem of an existing method for producing polymer particles, in which reverse iodine transfer polymerization and suspension polymerization are combined, will now be described with reference to FIG. 2.

Figure 2:
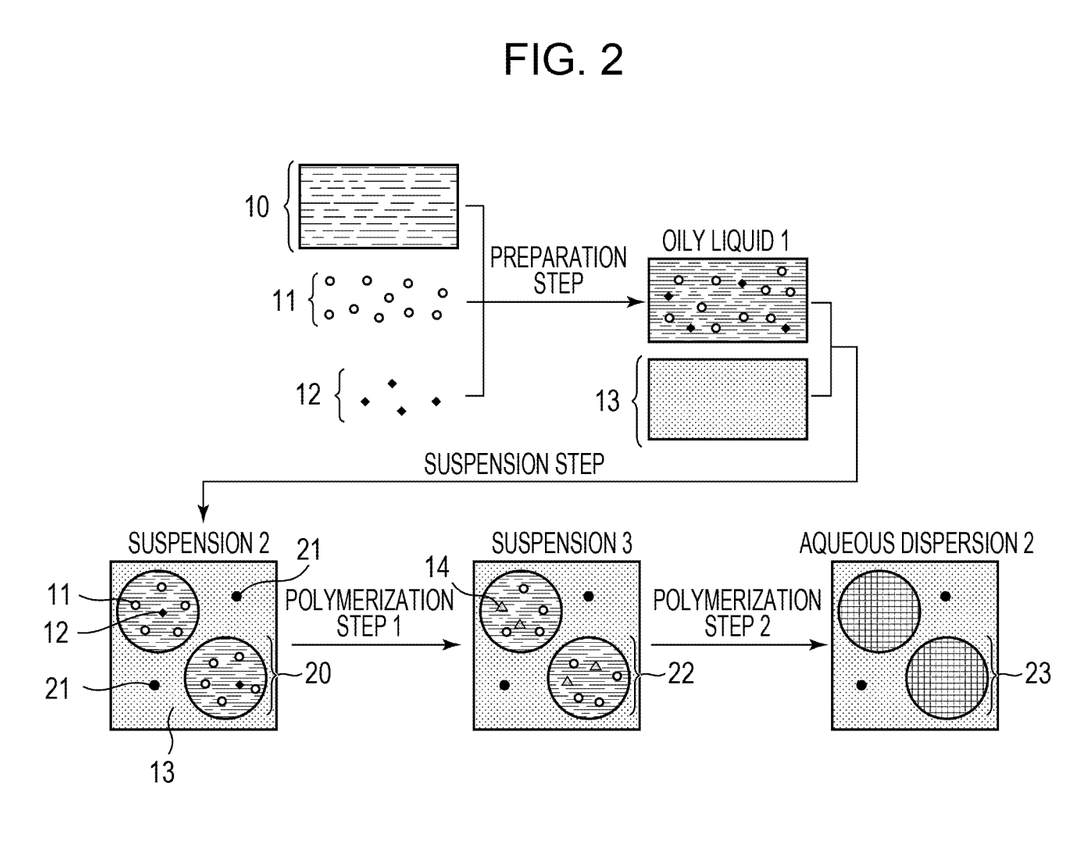
FIG. 2 is a process drawing illustrating a method for producing polymer particles in the related art.

FIG. 2 is a process drawing illustrating a method for producing polymer particles in the related art. In FIG. 2, an oily olefin monomer 10, a radical polymerization initiator 11, and iodine molecules 12 are mixed in a preparation step to obtain an oily liquid 1. Next, in a suspension step for suspending the oily liquid 1 in water 13, a suspension 2 in which oil droplets 20 of the oily liquid 1 are dispersed in the water 13 is obtained.

Next, in a polymerization step 1, an induction period of reverse iodine transfer polymerization is caused in the oil droplets 20, and radicals generated by cleavage of the radical polymerization initiator 11 and the iodine molecules 12 chemically react with each other to obtain a suspension 3 in which oil droplets 22 containing an iodine compound 14 are dispersed in the water 13. Lastly, in a polymerization step 2, a growth period of reverse iodine transfer polymerization is caused in the oil droplets 22 to obtain an aqueous dispersion 2 in which polymer particles 23 are dispersed in the water 13. For the sake of convenience of description, the polymerization step 1 (induction period) and the polymerization step 2 (growth period) have been separately described. However, these steps are a continuous polymerization step in the actual experimental operation.

The inventors of the present invention believe that, in the existing method for producing polymer particles in which reverse iodine transfer polymerization and suspension polymerization are combined, the essence of the problem occurs in the suspension step in FIG. 2. Specifically, the essence of the problem lies in that, when the oily liquid 1 is suspended in the water 13 in the suspension step to obtain the suspension 2 in which the oil droplets 20 of the oily liquid 1 are dispersed in the water 13, some of the iodine molecules 12 leak from the oil droplets 20 into the water 13 as iodide ions ($I^-$) 21.

Referring to formula (1), the molecular weight of a polymer compound in reverse iodine transfer polymerization is determined by the amount of iodine molecules charged. Therefore, the leakage of the iodine molecules 12 in FIG. 2 inevitably degrades the molecular-weight controllability. Furthermore, in the case where an organic peroxide polymerization initiator having a high oxidizing power is used as the radical polymerization initiator 11, the radical polymerization initiator 11 is decomposed by the iodide ions ($I^-$) 21, and thus the polymerization conversion rate is also decreased.

Next, a method for producing polymer particles according to the present embodiment will be described with reference to FIG. 1. According to the method for producing polymer particles of this embodiment, the essence of the problem in the related art illustrated in FIG. 2 can be solved.

Figure 1:
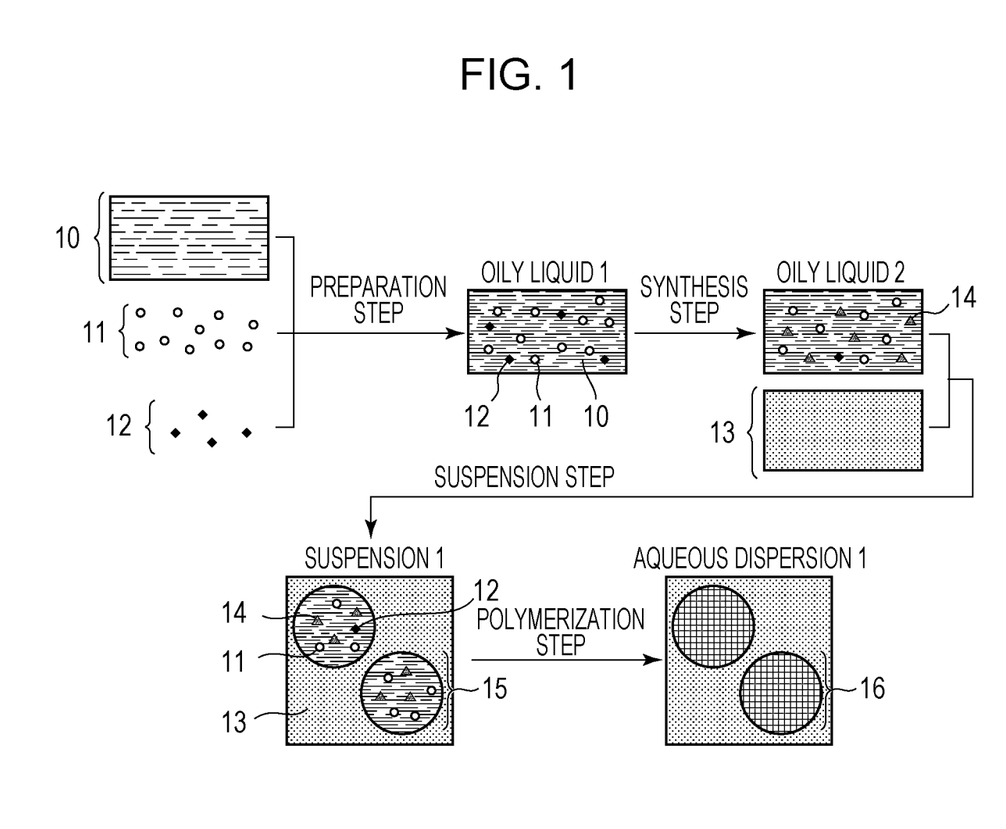
FIG. 1 is a process drawing illustrating a method for producing polymer particles according to an embodiment of the present invention.

In FIG. 1, an oily olefin monomer 10, a radical polymerization initiator 11, and iodine molecules 12 are mixed in a preparation step to obtain an oily liquid 1. Next, in a synthesis step, an induction period of reverse iodine transfer polymerization is caused in the oily liquid 1, and the radical polymerization initiator 11 and the iodine molecules 12 chemically react with each other to obtain an oily liquid 2 containing an iodine compound 14. Next, in a suspension step, the oily liquid 2 is suspended in water 13 to obtain a suspension 1 in which oil droplets 15 of the oily liquid 2 are dispersed in the water 13. Lastly, in a polymerization step, a growth period of reverse iodine transfer polymerization is caused in the oil droplets 15 to obtain an aqueous dispersion 1 in which polymer particles 16 are dispersed in the water 13.

A feature of the method illustrated in FIG. 1 lies in that, before the suspension step, some or all of the iodine molecules 12 are allowed to chemically react with radicals generated by cleavage of the radical polymerization initiator 11 to obtain the iodine compound 14. As described above, the iodine compound 14 has a chemical structure in which the residue 30 of the radical polymerization initiator 11 generated by a chemical reaction corresponding to the induction period in FIGS. 3A and 3B is directly bonded to an iodine atom. Since the iodine compound 14 has lipophilicity significantly higher than that of iodine molecules 12, the iodine compound 14 remains in the oil droplets 15 without leaking into the aqueous phase 13 in the suspension step. Even if some of unreacted iodine molecules 12 remain in the oily liquid 2 in the synthesis step, the amount thereof is very small, and thus leakage of the iodine molecules 12 into the aqueous phase 13 can be suppressed. Thus, the method for producing polymer particles in this embodiment essentially solves the problem in the existing method illustrated in FIG. 2. Note that an increase in the proportion of oligomers in the iodine compound 14 may not be preferred because the viscosity of the oily liquid 2 increases and it becomes difficult to carry out the suspension step.

In addition, the oily liquid 1 or the oily liquid 2 may contain functional substances in addition to the oily olefin monomer 10, the radical polymerization initiator 11, and the iodine molecules 12 as long as the object of this embodiment can be achieved.

Examples of the functional substance include imide compounds such as N-iodosuccinimide, succinimide, maleimide, and phthalic imide; aromatic amine compounds such as diphenylamine; and phosphorous acid compounds such as diethyl phosphite. The group of these compounds functions as a polymerization catalyst in reverse iodine transfer polymerization and contributes to an improvement in the rate of a polymerization reaction.

A hydrophobe (co-surfactant) having a solubility in water of 0.01 g/L or less may be incorporated as a functional substance in the oily liquid 1 or the oily liquid 2. A suspension is stabilized by using the hydrophobe. This is advantageous in that very small oil droplets are formed in a suspension step described below. Specific examples of the hydrophobe include a group of compounds such as (a) C8 to C30 linear chain, branched chain, or cyclic alkanes, e.g., hexadecane, squalane, and cyclooctane; (b) C8 to C30 alkyl (meth)acrylates, e.g., stearyl methacrylate and dodecyl methacrylate; (c) C8 to C30 alkyl alcohols, e.g., cetyl alcohol; (d) C8 to C30 alkylthiols, e.g., dodecyl mercaptan; (e) polymers, e.g., polyurethane, polyester, and polystyrene; and (f) long-chain aliphatic or aromatic carboxylic acids, long-chain aliphatic or aromatic carboxylic acid esters, long-chain aliphatic or aromatic amines, ketones, halogenated alkanes, silanes, siloxanes, and isocyanates.

In the case where an oil-soluble dye having a reactivity with iodine molecules, such as copper tetra-tert-butyl phthalocyanine, is used as a functional substance, the functional substance is preferably incorporated in the oily liquid 2 after a synthesis step described below. In the case where such a functional substance is incorporated in the oily liquid 1 before the synthesis step, it may become difficult to realize both a satisfactory polymerization conversion rate and molecular-weight controllability because of the effect of side reactions. Thus, incorporation of such a functional substance before the synthesis step is not preferable.

The functional substance is not limited to the above substances as long as the object of this embodiment can be achieved. The functional substances may be used in combination of two or more substances.

Preparation Step

A preparation step in this embodiment is a step for preparing an oily liquid 1 by mixing an oily olefin monomer, a radical polymerization initiator, and iodine molecules, and making these components compatible with each other. Oily organic solvents may be used in combination as an auxiliary agent that promotes the compatibilization. Furthermore, a chemical substance other than an oily olefin monomer, a radical polymerization initiator, iodine molecules, and oily organic solvents may also be added as long as the object of this embodiment can be achieved. In particular, in the case where the oily olefin monomer is a solid at room temperature, oily organic solvents are preferably used in combination. Examples of the oily organic solvents used in the preparation step include, but are not limited to, common oily organic solvents such as toluene, benzene, chloroform, and ethyl acetate. These oily organic solvents may be used in combination of two or more solvents.

Synthesis Step

A synthesis step in this embodiment is a step for synthesizing an iodine compound by allowing some or all of the iodine molecules to chemically react with radicals generated by cleavage of the radical polymerization initiator, and corresponds to the induction period of reverse iodine transfer polymerization. An oily liquid 2 contains at least the oily olefin monomer, the radical polymerization initiator, and the iodine compound.

As a method for inducing radical generation caused by cleavage of the radical polymerization initiator, a known method such as heating, light irradiation, or addition of a reducing agent may be used as long as the object of this embodiment can be achieved. Among these methods, heating is preferable from the standpoint of good workability and controllability of the chemical reaction. In the case where the chemical reaction is induced by heating, heating is preferably performed in the range of a 10-hour half-life temperature of the radical polymerization initiator or higher and 40° C. higher than the 10-hour half-life temperature or lower. More preferably, heating is performed in the range of a 10-hour half-life temperature of the radical polymerization initiator or higher and 30° C. higher than the 10-hour half-life temperature or lower. When heating is performed at a temperature higher than a temperature that is 40° C. higher than the 10-hour half-life temperature, controllability of the chemical reaction may become significantly degraded. When heating is performed at a temperature lower than the 10-hour half-life temperature, the operation time necessary for the synthesis step becomes very long. Thus, heating at a temperature lower than the 10-hour half-life temperature is not preferable from the standpoint of controllability of the chemical reaction and the operating efficiency. A plurality of methods may be used in combination as a method for inducing the chemical reaction. The method for inducing the chemical reaction of this embodiment is preferably performed in an atmosphere of an inert gas such as argon or nitrogen.

A molar ratio of the radical polymerization initiator to iodine molecules, i.e., [radical polymerization initiator (mol)]/[iodine molecule (mol)] is preferably more than 1 and 20 or less. In the case where the molar ratio is 1 or less, the polymerization reaction is terminated, and thus it is difficult to achieve a satisfactory polymerization conversion rate. On the other hand, in the case where the molar ratio exceeds 20, a chain reaction of the monomer without intervention of an iodine compound is caused as a side reaction, and thus it is difficult to achieve satisfactory molecular-weight controllability. A molar ratio of the oily olefin monomer to iodine molecules, i.e., [oily olefin monomer (mol)]/[iodine molecule (mol)] can be appropriately changed.

A ratio of the amount of iodine molecule contained in the oily liquid 2 to the amount of iodine molecule contained in the oily liquid 1 ([the amount (mol) of iodine molecule contained in the oily liquid 2]/[the amount (mol) of iodine molecule contained in the oily liquid 1]×100; iodine-molecule reaction rate [%]) is preferably 30% or more. An iodine-molecule reaction rate of less than 30% is not preferable because it is difficult to effectively suppress the leakage of iodine molecules into an aqueous phase in the suspension step and subsequent steps, and molecular-weight controllability is degraded. In particular, in the case where an organic peroxide polymerization initiator is used as the radical polymerization initiator, the iodine-molecule reaction rate is preferably 80% or more. This is because iodide ions ($I^-$) generated when iodine molecules leak into an aqueous phase induce decomposition of the organic peroxide polymerization initiator, and the polymerization conversion rate is decreased.

Suspension Step

A suspension step in this embodiment is a step for suspending the oily liquid 2 in water to obtain a suspension in which oil droplets of the oily liquid 2 are dispersed in water. A known stirring and shearing device with which a suspension is prepared by providing mechanical energy can be used for the suspension. Examples of the device include a high-shear homomixer, an ultrasonic homogenizer, a high-pressure homogenizer, and a thin-film rotating high-speed mixer. For the suspension, it is possible to use a known suspension method for obtaining a suspension on the basis of a surface-chemical mechanism, such as a membrane emulsification method using a shirasu porous glass (SPG) membrane, or a microreactor in a microchannel emulsification method, a branched microchannel emulsification method, or the like. These methods may be used alone or in combination of two or more methods.

In the suspension step in this embodiment, the oily liquid 2 preferably has a viscosity of 50 mPa·s or less. A viscosity of the oily liquid 2 of more than 50 mPa·s is not preferable because it is difficult to prepare a suspension having good dispersibility by providing mechanical energy.

In the suspension step in this embodiment, a dispersant may be incorporated in water in order to improve dispersion stability of the suspension. The dispersant may be added before the suspension step, during the suspension step, or after the suspension step as long as the object of this embodiment can be achieved. However, the dispersant is preferably added before or during the suspension step. In this embodiment, it is possible to use known dispersants such as anionic low-molecular-weight surfactants, cationic low-molecular-weight surfactants, nonionic low-molecular weight surfactants, anionic polymer dispersants, cationic polymer dispersants, nonionic polymer dispersants, and inorganic dispersants.

Among these dispersants, inorganic dispersants can be preferably used because they have a high effect of improving dispersion stability based on a blocking action and exhibit good stability against a temperature change. Furthermore, the use of inorganic dispersants is also preferable from the standpoint that polymer particles, which are target substances, can be easily separated and purified. Examples of the inorganic dispersants include polyvalent metal salts of phosphoric acid such as calcium phosphate, magnesium phosphate, aluminum phosphate, and zinc phosphate; carbonates such as calcium carbonate and magnesium carbonate; inorganic salts such as calcium metasilicate, calcium sulfate, and barium sulfate; calcium hydroxide; magnesium hydroxide; aluminum hydroxide; silica; bentonite; and alumina. However, the inorganic dispersants are not limited thereto as long as the object of this embodiment can be achieved.

These dispersants may be used alone or in combination of two or more dispersants. In addition, a chemical substance other than the dispersant may be added before the suspension step, during the suspension step, or after the suspension step as long as the object of this embodiment can be achieved.

In the method disclosed in Non-Patent Literature 4, since an excessive amount of hydrochloric acid is added to water, in particular, the dispersion-stabilizing performance of anionic low-molecular-weight surfactants, anionic polymer dispersants, and inorganic dispersants is degraded. Accordingly, this method may be disadvantageous as a method for producing polymer particles. In contrast, in this embodiment, any of these dispersants can be satisfactorily used, and thus the method according this embodiment of the present invention is advantageous as a method for producing polymer particles.

Polymerization Step

A polymerization step in this embodiment is a step for inducing the growth period of reverse iodine transfer polymerization in oil droplets of the oily liquid 2 dispersed in water to obtain an aqueous dispersion of polymer particles.

A method for inducing the growth period of reverse iodine transfer polymerization is the same as a typical method for inducing radical polymerization. Specifically, a known method such as heating, light irradiation, or addition of a reducing agent can be used. Among these methods, heating is preferable from the standpoint of good workability and controllability of a chemical reaction. In the case where the growth period is induced by heating, heating is preferably performed in the range of a 10-hour half-life temperature of the radical polymerization initiator or higher and 40° C. higher than the 10-hour half-life temperature or lower. More preferably, heating is performed in the range of a 10-hour half-life temperature of the radical polymerization initiator or higher and 30° C. higher than the 10-hour half-life temperature or lower. When heating is performed at a temperature higher than a temperature that is 40° C. higher than the 10-hour half-life temperature, controllability of the polymerization reaction may become significantly degraded. Heating at a temperature of higher than 100° C. is not preferable because the water of the suspension may boil. When heating is performed at a temperature lower than the 10-hour half-life temperature, the operation time necessary for the polymerization step becomes very long. Thus, heating at a temperature lower than the 10-hour half-life temperature is not preferable from the standpoint of controllability of the polymerization reaction and the operating efficiency.

In the polymerization step according to this embodiment, the heating temperature may be increased or decreased. A plurality of methods may be used in combination as a method for inducing the growth period of reverse iodine transfer polymerization. The method for inducing the growth period of reverse iodine transfer polymerization according to this embodiment of the present invention is preferably performed in an atmosphere of an inert gas such as argon or nitrogen.

Method for Recovering Polymer Particles

Polymer particles according to this embodiment of the present invention can be recovered from the aqueous dispersion of polymer particles obtained in the polymerization step by solid-liquid separation using a method such as decantation, filtration, or centrifugal separation. The method for recovering the polymer particles is not limited thereto, and other known methods may also be used as long as the object of this embodiment can be achieved. These methods may be used alone or in combination of two or more methods.

[Radical Polymerization Initiator]

Figure 5:
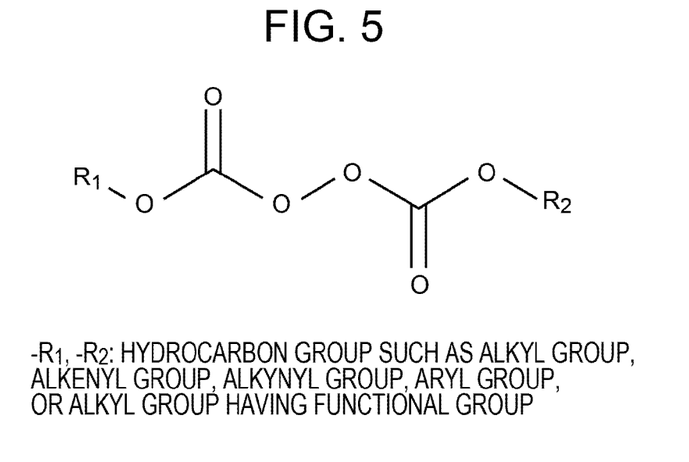
FIG. 5 is a drawing illustrating the chemical structure of a radical polymerization initiator having a peroxydicarbonate skeleton.

In this embodiment, known radical polymerization initiators can be used. Among known radical polymerization initiators, it is preferable to use oil-soluble radical polymerization initiators that have solubility in water at 20° C. of 10% by weight or less and that are soluble in the oily olefin monomer at reaction temperatures in the synthesis step and the polymerization step. Specific examples of the radical polymerization initiator include azo polymerization initiators such as 2,2'-azobisisobutyronitrile, 2,2'-azobis-(2-methylpropanenitrile), 2,2'-azobis-(2,4-dimethylpentanenitrile), 2,2'-azobis-(2-methylbutanenitrile), 1,1'-azobis-(cyclohexanecarbonitrile), 2,2'-azobis-(2,4-dimethyl-4-methoxyvaleronitrile), and 2,2'-azobis-(2,4-dimethylvaleronitrile); and organic peroxide polymerization initiators such as dibenzoyl peroxide, cumene hydroperoxide, di-2-ethylhexyl peroxydicarbonate, di-sec-butyl peroxydicarbonate, acetyl peroxide, and peracid esters (e.g., t-butyl peroctoate and α-cumyl peroxypivalate). Photoradical polymerization initiators such as acetophenones and ketals may also be used. Among these radical polymerization initiators, azo polymerization initiators and peroxide polymerization initiators having a peroxydicarbonate skeleton (refer to FIG. 5) are more preferably used. This is because, in experiments conducted by the inventors of the present invention, it was confirmed that the molecular-weight controllability and the polymerization conversion rate can be particularly satisfactorily controlled when an azo polymerization initiator or a peroxide polymerization initiator having a peroxydicarbonate skeleton is used.

[Oily Olefin Monomer]

An oily olefin monomer used in this embodiment is a monomer that is substantially immiscible with water and that forms an interface when mixed with water. The solubility of the oily olefin monomer in water is preferably 3% (3 g of the oily olefin monomer relative to 100 g of water) or less at room temperature (20° C.). When this condition is satisfied, a suspension can be satisfactorily formed in the suspension step. In addition, the oily olefin monomer is a radical polymerizable monomer that can be polymerized by cleavage of a radical polymerization initiator.

As the oily olefin monomer, polymerizable unsaturated aromatic monomers and polymerizable carboxylic acid esters are advantageous in compatibility with an organic solvent, stability of a suspension, controllability of a polymerization reaction, etc. Specific examples of the oily olefin monomers include styrene, chlorostyrene, α-methylstyrene, divinylbenzene, vinyltoluene, methyl (meth)acrylate, ethyl (meth)acrylate, and n-butyl (meth)acrylate. However, the oily olefin monomer is not limited thereto as long as the object of this embodiment can be achieved. These oily olefin monomers may be used alone. Alternatively, a plurality of oily olefin monomers may be mixed to form a copolymer, as required. Alternatively, a plurality of oily olefin monomers may be sequentially added to form a gradient copolymer or a block copolymer. In particular, in order to obtain polymer particles containing a block copolymer, the polymerization step is preferably conducted in multiple stages. For example, a polymerization step in a first stage is conducted using a single oily olefin monomer, and another oily olefin monomer is then charged into the resulting suspension to conduct a polymerization step in a second stage. Thus, polymer particles containing a block copolymer can be obtained.

[Polymer Particles]

The particle diameter of polymer particles according to the embodiment of the present invention can be appropriately adjusted by changing, for example, a suspension method in the suspension step or the type or the amount of dispersant used. The particle diameter of the polymer particles is not particularly limited, but the average particle diameter of the polymer particles is preferably 300 μm or less, more preferably 20 nm or more and 100 μm or less, and still more preferably 50 nm or more and 50 μm or less.

The polymer particles of this embodiment contain a polymer compound having an iodine atom at an end of a polymer chain. This iodine atom at the end can be identified by nuclear magnetic resonance (NMR) spectroscopy or the like. For example, an iodine atom bonded to an end of a polystyrene chain prepared on the basis of the embodiment of the present invention can be indirectly identified by detecting a signal (at 4 to 5 ppm in deuterochloroform) of a proton adjacent to the iodine atom by $^1$H NMR spectroscopy.

EXAMPLES

Examples of a method for producing polymer particles in this embodiment will now be described. However, the present embodiment is not limited to these Examples.

Measurement of Viscosity

A viscosity (mPa·s) of an oily liquid was measured with a cone-plate rotational viscometer (device: RE-85L viscometer, manufactured by Toki Sangyo Co., Ltd.).

Evaluation of Iodine-Molecule Reaction Rate

A reaction rate of iodine molecules was evaluated by observing an absorption band at about 500 nm derived from iodine molecules in respective oily liquids 1 and 2 using an ultraviolet-visible spectrophotometer. Specifically, an iodine-molecule reaction rate (%) was calculated by measuring the absorbance at 500 nm of each of the oily liquids 1 and 2, and quantitatively determining the amounts (mol) of iodine molecules in the oily liquids 1 and 2 by a calibration curve method.

Method for Measuring Polymerization Conversion Rate

A polymerization conversion rate was measured by gas chromatography (apparatus: manufactured by Agilent Technologies, column: HP-5 manufactured by Agilent Technologies) using a calibration curve method. Specifically, the amount of oily olefin monomer in a suspension before a polymerization step and the amount of oily olefin monomer in an aqueous dispersion of polymer particles after the polymerization step were estimated by gas chromatography, and the polymerization conversion rate was calculated from the difference between the amounts of oily olefin monomer.

Measurement of Molecular Weight

Regarding molecular weights of polymer particles, the number-average molecular weight ($M_n$), the weight-average molecular weight ($M_w$), and the peak molecular weight ($M_p$) were measured by gel permeation chromatography (apparatus: HLC-8121GPC/HT, manufactured by Tosoh Corporation, column: TSKgel G2000H$_{XL}$/G3000H$_{XL}$/G4000H$_{XL}$, manufactured by Tosoh Corporation, mobile phase: tetrahydrofuran).

Evaluation of Molecular-Weight Controllability

Molecular-weight controllability was evaluated by comparing a peak molecular weight ($M_{p,\,suspension}$) in the case of this embodiment where suspension polymerization and reverse iodine transfer polymerization were combined and a peak molecular weight ($M_{p,\,bulk}$) in the case where reverse iodine transfer polymerization was conducted by bulk polymerization with reference to Non-Patent Literature 3, the peak molecular weight ($M_{p,\,bulk}$) being described in a reference example described below, at a polymerization conversion rate of 90% or more. Specifically, when a ratio $M_{p,\,suspension}/M_{p,\,bulk}$ was 0.9 or more and 1.1 or less, the molecular-weight controllability was evaluated as good and denoted by "A". When the ratio was out of the above range, the molecular-weight controllability was evaluated as poor and denoted by "B". When the evaluation was not conducted, the molecular-weight controllability was denoted by "-".

Evaluation of Particle Diameter of Polymer Particles

Regarding the particle diameter of polymer particles, the number-average particle diameter was measured with a precise particle size distribution analyzer using a pore electrical resistance method "Coulter Counter Multisizer 3" (registered trademark, manufactured by Beckman Coulter, Inc.). In the measurement, "ISOTON II" (manufactured by Beckman Coulter, Inc.) was used as an electrolyte aqueous solution. On the other hand, regarding polymer particles having a particle diameter of less than 1 μm, the number-average particle diameter was measured with a precise particle size distribution analyzer using a dynamic light scattering method "DLS8000" (manufactured by Otsuka Electronics Co., Ltd.).

Example 1

Preparation Step

In a 100-mL glass container, 2.0 g of di-sec-butyl peroxydicarbonate (organic peroxide polymerization initiator, 10-hour half-life temperature: 51° C.), 0.7 g of iodine molecules, 2.8 g of a saturated polyester resin (polycondensate of propylene oxide-modified bisphenol A and isophthalic acid, Mw=10,000), and 56.2 g of styrene were charged, and uniformly mixed. A dark purple-red oily liquid 1 was then obtained.

[Synthesis Step]

Subsequently, nitrogen gas was bubbled through the oily liquid 1 prepared as described above in an ice bath at a flow rate of 200 mL/min for 30 minutes to remove oxygen dissolved in the oily liquid 1, and the oily liquid 1 was then heated to 70° C. in a water bath in a nitrogen atmosphere. After 15 minutes from the start of heating, heating was stopped at the time when the color of the oily liquid 1 changed from the dark purple-red to a light red and thus it was confirmed that a sufficient amount of an iodine compound was produced, and the resulting product was cooled to room temperature. Thus, a light red oily liquid 2 (viscosity: 1 mPa·s) was obtained. In this case, the iodine-molecule reaction rate was 82%.

[Suspension Step]

An aqueous liquid (pH 8 to 9) at 30° C. was prepared by adding 2.2 g of tricalcium phosphate (inorganic dispersant) to 220 g of ion-exchange water and stirring the mixture at 15,000 rpm for 30 minutes. The oily liquid 2 was poured into the aqueous liquid at one time. The mixture was stirred at 15,000 rpm for 10 minutes, and the stirring was then stopped. Thus, a suspension was obtained.

[Polymerization Step]

Next, the suspension was heated to 60° C. in a water bath in a nitrogen atmosphere. After seven hours from the start of heating, heating was stopped to obtain an aqueous dispersion of polymer particles. A part of the aqueous dispersion was subjected to solid-liquid separation by centrifugal separation. The solid was then washed with dilute hydrochloric acid to remove the inorganic dispersant, and dried. Thus, polymer particles were obtained as a white powder.

The polymerization conversion rate and the particle diameter were measured using the aqueous dispersion of polymer particles. The peak molecular weight ($M_{p, suspension}$) and the molecular-weight distribution ($M_w/M_n$) were measured using a solution prepared by dissolving the polymer particles obtained as the white powder in tetrahydrofuran and removing insoluble matter in the tetrahydrofuran solution by filtration. Furthermore, the molecular-weight controllability was evaluated by comparing the peak molecular weight ($M_{p, suspension}$) with the peak molecular weight ($M_{p, bulk}$) in Reference Example 1. The results are summarized in Table 1.

Example 2

An aqueous dispersion of polymer particles and polymer particles were obtained as in Example 1 under the conditions of an iodine-molecule reaction rate of the oily liquid 2 of 82% and a viscosity of the oily liquid 2 of 1 mPa·s except that 56.2 g of styrene in Example 1 was changed to 56.2 g of methyl methacrylate.

The polymerization conversion rate and the particle diameter were measured using the aqueous dispersion of polymer particles. The peak molecular weight ($M_{p, suspension}$) and the molecular-weight distribution ($M_w/M_n$) were measured using a solution prepared by dissolving the polymer particles obtained as a white powder in tetrahydrofuran and removing insoluble matter in the tetrahydrofuran solution by filtration. Furthermore, the molecular-weight controllability was evaluated by comparing the peak molecular weight ($M_{p, suspension}$) with the peak molecular weight ($M_{p, bulk}$) in Reference Example 2. The results are summarized in Table 1.

Example 3

An aqueous dispersion of polymer particles and polymer particles were obtained as in Example 1 under the conditions of an iodine-molecule reaction rate of the oily liquid 2 of 82% and a viscosity of the oily liquid 2 of 1 mPa·s except that 56.2 g of styrene in Example 1 was changed to 44.7 g of styrene and 11.5 g of methyl methacrylate.

The polymerization conversion rate and the particle diameter were measured using the aqueous dispersion of polymer particles. The peak molecular weight ($M_{p, suspension}$) and the molecular-weight distribution ($M_w/M_n$) were measured using a solution prepared by dissolving the polymer particles obtained as a white powder in tetrahydrofuran and removing insoluble matter in the tetrahydrofuran solution by filtration. Furthermore, the molecular-weight controllability was evaluated by comparing the peak molecular weight ($M_{p, suspension}$) with the peak molecular weight ($M_{p, bulk}$) in Reference Example 3. The results are summarized in Table 1.

Example 4

An aqueous dispersion of polymer particles and polymer particles were obtained as in Example 1 under the conditions of an iodine-molecule reaction rate of the oily liquid 2 of 86% and a viscosity of the oily liquid 2 of 1 mPa·s except that, in Example 1, 2.0 g of di-sec-butyl peroxydicarbonate was changed to 2.1 g of 2,2'-azobis-(2,4-dimethylvaleronitrile) (azo polymerization initiator, 10-hour half-life temperature: 51° C.), the heating time in the synthesis step was changed from 15 minutes to 25 minutes, and the polymerization temperature was changed from 60° C. to 70° C.

The polymerization conversion rate and the particle diameter were measured using the aqueous dispersion of polymer particles. The peak molecular weight ($M_{p, suspension}$) and the molecular-weight distribution ($M_w/M_n$) were measured using a solution prepared by dissolving the polymer particles obtained as a white powder in tetrahydrofuran and removing insoluble matter in the tetrahydrofuran solution by filtration. Furthermore, the molecular-weight controllability was evaluated by comparing the peak molecular weight ($M_{p, suspension}$)

Example 5

An aqueous dispersion of polymer particles and polymer particles were obtained as in Example 2 under the conditions of an iodine-molecule reaction rate of the oily liquid 2 of 86% and a viscosity of the oily liquid 2 of 1 mPa·s except that, in Example 2, 2.0 g of di-sec-butyl peroxydicarbonate was changed to 2.1 g of 2,2'-azobis-(2,4-dimethylvaleronitrile), the heating time in the synthesis step was changed from 15 minutes to 25 minutes, and the polymerization temperature was changed from 60° C. to 70° C.

The polymerization conversion rate and the particle diameter were measured using the aqueous dispersion of polymer particles. The peak molecular weight ($M_{p,\ suspension}$) and the molecular-weight distribution ($M_w/M_n$) were measured using a solution prepared by dissolving the polymer particles obtained as a white powder in tetrahydrofuran and removing insoluble matter in the tetrahydrofuran solution by filtration. Furthermore, the molecular-weight controllability was evaluated by comparing the peak molecular weight ($M_{p,\ suspension}$) with the peak molecular weight ($M_{p,\ bulk}$) in Reference Example 5. The results are summarized in Table 1.

Example 6

An aqueous dispersion of polymer particles and polymer particles were obtained as in Example 3 under the conditions of an iodine-molecule reaction rate of the oily liquid 2 of 86% and a viscosity of the oily liquid 2 of 1 mPa·s except that, in Example 3, 2.0 g of di-sec-butyl peroxydicarbonate was changed to 2.1 g of 2,2'-azobis-(2,4-dimethylvaleronitrile), the heating time in the synthesis step was changed from 15 minutes to 25 minutes, and the polymerization temperature was changed from 60° C. to 70° C.

The polymerization conversion rate and the particle diameter were measured using the aqueous dispersion of polymer particles. The peak molecular weight ($M_{p,\ suspension}$) and the molecular-weight distribution ($M_w/M_n$) were measured using a solution prepared by dissolving the polymer particles obtained as a white powder in tetrahydrofuran and removing insoluble matter in the tetrahydrofuran solution by filtration. Furthermore, the molecular-weight controllability was evaluated by comparing the peak molecular weight ($M_{p,\ suspension}$) with the peak molecular weight ($M_{p,\ bulk}$) in Reference Example 6. The results are summarized in Table 1.

Example 7

An aqueous dispersion of polymer particles and polymer particles were obtained as in Example 1 under the conditions of an iodine-molecule reaction rate of the oily liquid 2 of 100% and a viscosity of the oily liquid 2 of 2 mPa·s except that the heating time in the synthesis step in Example 1 was changed from 15 minutes to 20 minutes.

The polymerization conversion rate and the particle diameter were measured using the aqueous dispersion of polymer particles. The peak molecular weight ($M_{p,\ suspension}$) and the molecular-weight distribution ($M_w/M_n$) were measured using a solution prepared by dissolving the polymer particles obtained as a white powder in tetrahydrofuran and removing insoluble matter in the tetrahydrofuran solution by filtration. Furthermore, the molecular-weight controllability was evaluated by comparing the peak molecular weight ($M_{p,\ suspension}$) with the peak molecular weight ($M_{p,\ bulk}$) in Reference Example 1. The results are summarized in Table 2.

Example 8

An aqueous dispersion of polymer particles and polymer particles were obtained as in Example 4 under the conditions of an iodine-molecule reaction rate of the oily liquid 2 of 33% and a viscosity of the oily liquid 2 of 1 mPa·s except that the heating time in the synthesis step in Example 4 was changed from 25 minutes to 12 minutes.

The polymerization conversion rate and the particle diameter were measured using the aqueous dispersion of polymer particles. The peak molecular weight ($M_{p,\ suspension}$) and the molecular-weight distribution ($M_w/M_n$) were measured using a solution prepared by dissolving the polymer particles obtained as a white powder in tetrahydrofuran and removing insoluble matter in the tetrahydrofuran solution by filtration. Furthermore, the molecular-weight controllability was evaluated by comparing the peak molecular weight ($M_{p,\ suspension}$) with the peak molecular weight ($M_{p,\ bulk}$) in Reference Example 4. The results are summarized in Table 2.

Example 9

An aqueous dispersion of polymer particles and polymer particles were obtained as in Example 4 under the conditions of an iodine-molecule reaction rate of the oily liquid 2 of 100% and a viscosity of the oily liquid 2 of 2 mPa·s except that the heating time in the synthesis step in Example 4 was changed from 25 minutes to 35 minutes.

The polymerization conversion rate and the particle diameter were measured using the aqueous dispersion of polymer particles. The peak molecular weight ($M_{p,\ suspension}$) and the molecular-weight distribution ($M_w/M_n$) were measured using a solution prepared by dissolving the polymer particles obtained as a white powder in tetrahydrofuran and removing insoluble matter in the tetrahydrofuran solution by filtration. Furthermore, the molecular-weight controllability was evaluated by comparing the peak molecular weight ($M_{p,\ suspension}$) with the peak molecular weight ($M_{p,\ bulk}$) in Reference Example 4. The results are summarized in Table 2.

Example 10

An aqueous dispersion of polymer particles and polymer particles were obtained as in Example 4 under the conditions of an iodine-molecule reaction rate of the oily liquid 2 of 100% and a viscosity of the oily liquid 2 of 10 mPa·s except that the heating time in the synthesis step in Example 4 was changed from 25 minutes to 60 minutes.

The polymerization conversion rate and the particle diameter were measured using the aqueous dispersion of polymer particles. The peak molecular weight ($M_{p,\ suspension}$) and the molecular-weight distribution ($M_w/M_n$) were measured using a solution prepared by dissolving the polymer particles obtained as a white powder in tetrahydrofuran and removing insoluble matter in the tetrahydrofuran solution by filtration. Furthermore, the molecular-weight controllability was evaluated by comparing the peak molecular weight ($M_{p,\ suspension}$) with the peak molecular weight ($M_{p,\ bulk}$) in Reference Example 4. The results are summarized in Table 3.

Example 11

An aqueous dispersion of polymer particles and polymer particles were obtained as in Example 4 under the conditions of an iodine-molecule reaction rate of the oily liquid 2 of 100% and a viscosity of the oily liquid 2 of 25 mPa·s except that the heating time in the synthesis step in Example 4 was changed from 25 minutes to 75 minutes.

The polymerization conversion rate and the particle diameter were measured using the aqueous dispersion of polymer particles. The peak molecular weight (M p, suspension) and the molecular-weight distribution ($M_w/M_n$) were measured using a solution prepared by dissolving the polymer particles obtained as a white powder in tetrahydrofuran and removing insoluble matter in the tetrahydrofuran solution by filtration. Furthermore, the molecular-weight controllability was evaluated by comparing the peak molecular weight ($M_{p, suspension}$) with the peak molecular weight ($M_{p, bulk}$) in Reference Example 4. The results are summarized in Table 3.

Example 12

An aqueous dispersion of polymer particles and polymer particles were obtained as in Example 4 under the conditions of an iodine-molecule reaction rate of the oily liquid 2 of 100% and a viscosity of the oily liquid 2 of 50 mPa·s except that the heating time in the synthesis step in Example 4 was changed from 25 minutes to 90 minutes.

The polymerization conversion rate and the particle diameter were measured using the aqueous dispersion of polymer particles. The peak molecular weight ($M_{p, suspension}$) and the molecular-weight distribution ($M_w/M_n$) were measured using a solution prepared by dissolving the polymer particles obtained as a white powder in tetrahydrofuran and removing insoluble matter in the tetrahydrofuran solution by filtration. Furthermore, the molecular-weight controllability was evaluated by comparing the peak molecular weight ($M_{p, suspension}$) with the peak molecular weight ($M_{p, bulk}$) in Reference Example 4. The results are summarized in Table 3.

Example 13

Preparation Step

In a 100-mL glass container, 2.0 g of di-sec-butyl peroxydicarbonate (organic peroxide polymerization initiator, 10-hour half-life temperature: 51° C.), 0.7 g of iodine molecules, 2.8 g of a saturated polyester resin (polycondensate of propylene oxide-modified bisphenol A and isophthalic acid, Mw=10,000), 25.6 g of butyl acrylate, and 20.0 g of toluene were charged, and uniformly mixed. A dark purple-red oily liquid 1 was then obtained.
[Synthesis Step]

Subsequently, nitrogen gas was bubbled through the oily liquid 1 prepared as described above in an ice bath at a flow rate of 200 mL/min for 30 minutes to remove oxygen dissolved in the oily liquid 1, and the oily liquid 1 was then heated to 70° C. in a water bath in a nitrogen atmosphere. After 15 minutes from the start of heating, heating was stopped at the time when the color of the oily liquid 1 changed from the dark purple-red to a light red and thus it was confirmed that a sufficient amount of an iodine compound was produced, and the resulting product was cooled to room temperature. Thus, a light red oily liquid 2 (viscosity: 1 mPa·s) was obtained. In this case, the iodine-molecule reaction rate was 82%.
[Suspension Step]

An aqueous liquid (pH 8 to 9) at 30° C. was prepared by adding 2.2 g of tricalcium phosphate (inorganic dispersant) to 220 g of ion-exchange water and stirring the mixture at 15,000 rpm for 30 minutes. The oily liquid 2 was poured into the aqueous liquid at one time. The mixture was stirred at 15,000 rpm for 10 minutes, and the stirring was then stopped. Thus, a suspension was obtained.
[Polymerization Step]

Next, a polymerization step in a first stage was conducted. The suspension was heated to 60° C. in a water bath in a nitrogen atmosphere. A suspension 1 after 4 hours from the start of heating was sampled. Subsequently, a polymerization step in a second stage was conducted. A solution prepared by dissolving 0.5 g of di-sec-butyl peroxydicarbonate in 35.4 g of styrene was finely dispersed in 100 g of water using an ultrasonic homogenizer to prepare a dispersion. This dispersion was charged in the suspension to prepare a mixture. A suspension 2 obtained after heating this mixture at 60° C. for 12 hours was sampled.

The polymerization conversion rate, the peak molecular weight (M suspension) and the molecular-weight distribution ($M_w/M_n$) of the polymer particles in the suspension 1 were measured. It was confirmed that the polymerization conversion rate was 98%, the peak molecular weight ($M_{p, suspension}$) was 4,400, and the molecular-weight distribution ($M_w/M_n$) was 1.6. The polymerization conversion rate, the peak molecular weight ($M_{p, suspension}$) and the molecular-weight distribution ($M_w/M_n$) of the polymer particles in the suspension 2 were measured. It was confirmed that the polymerization conversion rate was 90%, the peak molecular weight ($M_{p, suspension}$) was 10,100, and the molecular-weight distribution ($M_w/M_n$) was 1.5.

From the above results, it was considered that polymer particles containing a block copolymer composed of butyl acrylate and styrene could be prepared.

Example 14

Preparation Step

In a 100-mL glass container, 2.0 g of di-sec-butyl peroxydicarbonate (organic peroxide polymerization initiator, 10-hour half-life temperature: 51° C.), 0.7 g of iodine molecules, 2.8 g of a saturated polyester resin (polycondensate of propylene oxide-modified bisphenol A and isophthalic acid, Mw=10,000), 56.2 g of styrene, and 7.7 g of hexadecane were charged, and uniformly mixed. A dark purple-red oily liquid 1 was then obtained.
[Synthesis Step]

Subsequently, nitrogen gas was bubbled through the oily liquid 1 prepared as described above in an ice bath at a flow rate of 200 mL/min for 30 minutes to remove oxygen dissolved in the oily liquid 1, and the oily liquid 1 was then heated to 70° C. in a water bath in a nitrogen atmosphere. After 15 minutes from the start of heating, heating was stopped at the time when the color of the oily liquid 1 changed from the dark purple-red to a light red and thus it was confirmed that a sufficient amount of an iodine compound was produced, and the resulting product was cooled to room temperature. Thus, a light red oily liquid 2 (viscosity: 1 mPa·s) was obtained. In this case, the iodine-molecule reaction rate was 82%.
[Suspension Step]

An aqueous liquid (pH 8 to 9) at 30° C. was prepared by adding 1.36 g of sodium dodecyl sulfate to 90 g of ion-exchange water. The oily liquid 2 was poured into the aqueous liquid at one time. The mixture was treated with an ultrasonic homogenizer of 300 W at 4° C. for ten minutes in a nitrogen atmosphere. Thus, a suspension was obtained.

[Polymerization Step]

Next, the suspension was heated to 60° C. in a water bath in a nitrogen atmosphere. The suspension after 6 hours from the start of heating was sampled, and the particle diameter (number-average particle diameter), the polymerization conversion rate, the peak molecular weight ($M_{p,\ suspension}$) and the molecular-weight distribution ($M_w/M_n$) of the prepared polymer particles were measured. The particle diameter was 192 nm, the polymerization conversion rate was 95%, the peak molecular weight ($M_{p,\ suspension}$) was 10,700, and the molecular-weight distribution ($M_w/M_n$) was 1.5. The peak molecular weight ($M_{p,\ suspension}$) of this Example was compared with the peak molecular weight ($M_{p,\ bulk}$) in Reference Example 1. The ratio $M_{p,\ suspension}/M_{p,\ bulk}$ was in the range of 0.9 to 1.1. Thus, it was considered that the molecular-weight controllability of this Example was good.

Example 15

An aqueous dispersion of polymer particles and polymer particles were obtained as in Example 4 except that, in Example 4, after the synthesis step, 0.3 g of an oil-soluble dye (copper tetra-tert-butyl phthalocyanine) was added as a functional substance to the oily liquid 2 and dissolved.

The polymerization conversion rate and the particle diameter were measured using the aqueous dispersion of polymer particles. The peak molecular weight ($M_{p,\ suspension}$) and the molecular-weight distribution ($M_w/M_n$) were measured using a solution prepared by dissolving the polymer particles obtained as a white powder in tetrahydrofuran and removing insoluble matter in the tetrahydrofuran solution by filtration. The particle diameter was 4.6 μm, the polymerization conversion rate was 93%, the peak molecular weight ($M_{p,\ suspension}$) was 10,600, and the molecular-weight distribution ($M_w/M_n$) was 1.5. The peak molecular weight ($M_{p,\ suspension}$) of this Example was compared with the peak molecular weight ($M_{p,\ bulk}$) in Reference Example 4. The ratio $M_{p,\ suspension}/M_{p,\ bulk}$ was in the range of 0.9 to 1.1. Thus, it was considered that the molecular-weight controllability of this Example was good.

Reference Example 1

Reference Examples described below are examples in which bulk polymerization was used in a polymerization reaction. In bulk polymerization, the reaction system is considered to be a single oil droplet, and a polymerization reaction occurs in the single oil droplet. In other words, bulk polymerization can be considered to be a reaction that occurs in a single oil droplet in suspension polymerization, the oil droplet being isolated from the outside.

Accordingly, in Reference Examples described below, whether data of Examples described above is ideal data or not is determined by comparing data of bulk polymerization with data of corresponding Example.

In a 100-mL glass container, 2.0 g of di-sec-butyl peroxydicarbonate, 0.7 g of iodine molecules, and 56.2 g of styrene were charged, and uniformly mixed. A dark purple-red oily liquid was then obtained. Subsequently, nitrogen gas was bubbled through this oily liquid in an ice bath at a flow rate of 200 mL/min for 30 minutes to remove oxygen dissolved in the oily liquid, and the oily liquid was then heated to 70° C. in a water bath in a nitrogen atmosphere. A polymer compound was obtained after seven hours from the start of heating. The polymerization conversion rate, the peak molecular weight ($M_{p,\ bulk}$), and the molecular-weight distribution ($M_w/M_n$) of the polymer compound were measured. The results are summarized in Table 1.

Reference Example 2

A polymer compound was obtained as in Reference Example 1 except that 56.2 g of styrene in Reference Example 1 was changed to 56.2 g of methyl methacrylate. The polymerization conversion rate, the peak molecular weight ($M_{p,\ bulk}$), and the molecular-weight distribution ($M_w/M_n$) of the polymer compound obtained after seven hours from the start of heating were measured. The results are summarized in Table 1.

Reference Example 3

A polymer compound was obtained as in Reference Example 1 except that 56.2 g of styrene in Reference Example 1 was changed to 44.7 g of styrene and 11.5 g of methyl methacrylate. The polymerization conversion rate, the peak molecular weight ($M_{p,\ bulk}$), and the molecular-weight distribution ($M_w/M_n$) of the polymer compound obtained after seven hours from the start of heating were measured. The results are summarized in Table 1.

Reference Example 4

A polymer compound was obtained as in Reference Example 1 except that, in Reference Example 1, 2.0 g of di-sec-butyl peroxydicarbonate was changed to 2.1 g of 2,2'-azobis-(2,4-dimethylvaleronitrile), and the polymerization temperature was changed from 60° C. to 70° C. The polymerization conversion rate, the peak molecular weight ($M_{p,\ bulk}$), and the molecular-weight distribution ($M_w/M_n$) of the polymer compound obtained after seven hours from the start of heating were measured. The results are summarized in Table 1.

Reference Example 5

A polymer compound was obtained as in Reference Example 2 except that, in Reference Example 2, 2.0 g of di-sec-butyl peroxydicarbonate was changed to 2.1 g of 2,2'-azobis-(2,4-dimethylvaleronitrile), and the polymerization temperature was changed from 60° C. to 70° C. The polymerization conversion rate, the peak molecular weight ($M_{p,\ bulk}$), and the molecular-weight distribution ($M_w/M_n$) of the polymer compound obtained after seven hours from the start of heating were measured. The results are summarized in Table 1.

Reference Example 6

A polymer compound was obtained as in Reference Example 3 except that, in Reference Example 3, 2.0 g of di-sec-butyl peroxydicarbonate was changed to 2.1 g of 2,2'-azobis-(2,4-dimethylvaleronitrile), and the polymerization temperature was changed from 60° C. to 70° C. The polymerization conversion rate, the peak molecular weight ($M_{p,\ bulk}$), and the molecular-weight distribution ($M_w/M_n$) of the polymer compound obtained after seven hours from the start of heating were measured. The results are summarized in Table 1.

Comparative Example 1

Preparation Step

In a 100-mL glass container, 2.0 g of di-sec-butyl peroxydicarbonate, 0.7 g of iodine molecules, 2.8 g of a saturated polyester resin (polycondensate of propylene oxide-modified bisphenol A and isophthalic acid, Mw=10,000), and 56.2 g of styrene were charged, and uniformly mixed. A dark purplered oily liquid 1 was then obtained.

[Suspension Step]

An aqueous liquid (pH 8 to 9) at 30° C. was prepared by adding 2.2 g of tricalcium phosphate particles (inorganic dispersant) to 220 g of ion-exchange water and stirring the mixture at 15,000 rpm for 30 minutes. The oily liquid 1 was poured into the aqueous liquid at one time. The mixture was stirred at 15,000 rpm for 10 minutes at 30° C., and the stirring was then stopped. Thus, a suspension was obtained.

[Polymerization Step]

Next, the suspension was heated to 60° C. in a water bath in a nitrogen atmosphere. After seven hours from the start of heating, heating was stopped to obtain an aqueous dispersion of polymer particles. A part of the aqueous dispersion was subjected to solid-liquid separation by centrifugal separation. The solid was then washed with dilute hydrochloric acid to remove the inorganic dispersant, and dried. Thus, polymer particles were obtained as a white powder.

The polymerization conversion rate and the particle diameter were measured using the aqueous dispersion of polymer particles. The peak molecular weight ($M_{p, suspension}$) and the molecular-weight distribution ($M_w/M_n$) were measured using a solution prepared by dissolving the polymer particles obtained as the white powder in tetrahydrofuran and removing insoluble matter in the tetrahydrofuran solution by filtration. Even when heating was performed for seven hours or more, the polymerization conversion rate remained substantially the same, and hardly changed. Since the polymerization conversion rate in this Comparative Example did not reach 90%, the evaluation of molecular-weight controllability based on the comparison with the peak molecular weight ($M_{p, bulk}$) in Reference Example 1 could not be performed. The results are summarized in Table 1.

Comparative Example 2

An aqueous dispersion of polymer particles and polymer particles were obtained as in Comparative Example 1 except that 56.2 g of styrene in Comparative Example 1 was changed to 56.2 g of methyl methacrylate.

The polymerization conversion rate and the particle diameter were measured using the aqueous dispersion of polymer particles. The peak molecular weight ($M_{p, suspension}$) and the molecular-weight distribution ($M_w/M_n$) were measured using a solution prepared by dissolving the polymer particles obtained as a white powder in tetrahydrofuran and removing insoluble matter in the tetrahydrofuran solution by filtration. Even when heating was performed for seven hours or more, the polymerization conversion rate remained substantially the same, and hardly changed. Since the polymerization conversion rate in this Comparative Example did not reach 90%, the evaluation of molecular-weight controllability based on the comparison with the peak molecular weight ($M_{p, bulk}$) in Reference Example 2 could not be performed. The results are summarized in Table 1.

Comparative Example 3

An aqueous dispersion of polymer particles and polymer particles were obtained as in Comparative Example 1 except that 56.2 g of styrene in Comparative Example 1 was changed to 44.7 g of styrene and 11.5 g of methyl methacrylate.

The polymerization conversion rate and the particle diameter were measured using the aqueous dispersion of polymer particles. The peak molecular weight ($M_{p, suspension}$) and the molecular-weight distribution ($M_w/M_n$) were measured using a solution prepared by dissolving the polymer particles obtained as a white powder in tetrahydrofuran and removing insoluble matter in the tetrahydrofuran solution by filtration. Even when heating was performed for seven hours or more, the polymerization conversion rate remained substantially the same, and hardly changed. Since the polymerization conversion rate in this Comparative Example did not reach 90%, the evaluation of molecular-weight controllability based on the comparison with the peak molecular weight ($M_{p, bulk}$) in Reference Example 3 could not be performed. The results are summarized in Table 1.

Comparative Example 4

An aqueous dispersion of polymer particles and polymer particles were obtained as in Comparative Example 1 except that, in Comparative Example 1, 2.0 g of di-sec-butyl peroxydicarbonate was changed to 2.1 g of 2,2'-azobis-(2,4-dimethylvaleronitrile), and the polymerization temperature was changed from 60° C. to 70° C.

The polymerization conversion rate and the particle diameter were measured using the aqueous dispersion of polymer particles. The peak molecular weight ($M_{p, suspension}$) and the molecular-weight distribution ($M_w/M_n$) were measured using a solution prepared by dissolving the polymer particles obtained as a white powder in tetrahydrofuran and removing insoluble matter in the tetrahydrofuran solution by filtration. Furthermore, the molecular-weight controllability was evaluated by comparing the peak molecular weight ($M_{p, suspension}$) with the peak molecular weight ($M_{p, bulk}$) in Reference Example 4. The results are summarized in Table 1.

Comparative Example 5

An aqueous dispersion of polymer particles and polymer particles were obtained as in Comparative Example 2 except that, in Comparative Example 2, 2.0 g of di-sec-butyl peroxydicarbonate was changed to 2.1 g of 2,2'-azobis-(2,4-dimethylvaleronitrile), and the polymerization temperature was changed from 60° C. to 70° C.

The polymerization conversion rate and the particle diameter were measured using the aqueous dispersion of polymer particles. The peak molecular weight ($M_{p, suspension}$) and the molecular-weight distribution ($M_w/M_n$) were measured using a solution prepared by dissolving the polymer particles obtained as a white powder in tetrahydrofuran and removing insoluble matter in the tetrahydrofuran solution by filtration. Furthermore, the molecular-weight controllability was evaluated by comparing the peak molecular weight ($M_{p, suspension}$) with the peak molecular weight ($M_{p, bulk}$) in Reference Example 5. The results are summarized in Table 1.

Comparative Example 6

An aqueous dispersion of polymer particles and polymer particles were obtained as in Comparative Example 3 except that, in Comparative Example 3, 2.0 g of di-sec-butyl peroxydicarbonate was changed to 2.1 g of 2,2'-azobis-(2,4-dimethylvaleronitrile), and the polymerization temperature was changed from 60° C. to 70° C.

The polymerization conversion rate and the particle diameter were measured using the aqueous dispersion of polymer particles. The peak molecular weight ($M_{p,\ suspension}$) and the molecular-weight distribution ($M_w/M_n$) were measured using a solution prepared by dissolving the polymer particles obtained as a white powder in tetrahydrofuran and removing insoluble matter in the tetrahydrofuran solution by filtration. Furthermore, the molecular-weight controllability was evaluated by comparing the peak molecular weight ($M_{p,\ suspension}$) with the peak molecular weight ($M_{p,\ bulk}$) in Reference Example 6. The results are summarized in Table 1.

Comparative Example 7

An aqueous dispersion of polymer particles and polymer particles were obtained as in Comparative Example 1 except that, in Comparative Example 1, before the suspension step, the pH of the aqueous liquid was adjusted to 5 by adding 1.0 mL of a 2 mol/L aqueous hydrochloric acid solution to the aqueous liquid, and 1.0 mL of a 31% aqueous hydrogen peroxide was added as an oxidizing agent to the aqueous liquid.

The polymerization conversion rate and the particle diameter were measured using the aqueous dispersion of polymer particles. The peak molecular weight ($M_{p,\ suspension}$) and the molecular-weight distribution ($M_w/M_n$) were measured using a solution prepared by dissolving the polymer particles obtained as a white powder in tetrahydrofuran and removing insoluble matter in the tetrahydrofuran solution by filtration. Furthermore, the molecular-weight controllability was evaluated by comparing the peak molecular weight ($M_{p,\ suspension}$) with the peak molecular weight ($M_{p,\ bulk}$) in Reference Example 1. The results are summarized in Table 1.

Comparative Example 8

In Comparative Example 1, before the suspension step, the pH of the aqueous liquid was adjusted to 2 by adding 20 mL of a 2 mol/L aqueous hydrochloric acid solution to the aqueous liquid, and 1.0 mL of a 31% aqueous hydrogen peroxide was added as an oxidizing agent to the aqueous liquid. The suspension step was then tried. However, tricalcium phosphate functioning as a dispersant was dissolved, and a stable suspension could not be prepared. Consequently, aggregation occurred, and polymer particles in a dispersed state could not be obtained.

Comparative Example 9

The heating time in the synthesis step in Example 4 was changed from 25 minutes to 100 minutes, and the suspension step was tried as in Example 4 under the conditions of an iodine-molecule reaction rate of the oily liquid 2 of 100% and a viscosity of 150 mPa·s. However, since a stable suspension could not be prepared, aggregation occurred, and polymer particles in a dispersed state could not be obtained.

TABLE 1

|  | Monomer | Polymerization initiator | Polymerization method | Synthesis step | Iodine-molecule reaction rate/% | Viscosity/mPa·s |
|---|---|---|---|---|---|---|
| Example 1 | St | Di-sec-butyl peroxydicarbonate | Suspension polymerization | Performed | 82 | 1 |
| Example 2 | MMA |  |  |  |  |  |
| Example 3 | St/MMA |  |  |  |  |  |
| Example 4 | St | 2,2'-Azobis-(2,4-dimethylvaleronitrile) |  |  | 86 |  |
| Example 5 | MMA |  |  |  |  |  |
| Example 6 | St/MMA |  |  |  |  |  |
| Ref. Ex. 1 | St | Di-sec-butyl peroxydicarbonate | Bulk polymerization | Not performed |  |  |
| Ref. Ex. 2 | MMA |  |  |  |  |  |
| Ref. Ex. 3 | St/MMA |  |  |  |  |  |
| Ref. Ex. 4 | St | 2,2'-Azobis-(2,4-dimethylvaleronitrile) |  |  |  |  |
| Ref. Ex. 5 | MMA |  |  |  |  |  |
| Ref. Ex. 6 | St/MMA |  |  |  |  |  |
| Com. Ex. 1 | St | Di-sec-butyl peroxydicarbonate | Suspension polymerization | Not performed |  |  |
| Com. Ex. 2 | MMA |  |  |  |  |  |
| Com. Ex. 3 | St/MMA |  |  |  |  |  |
| Com. Ex. 4 | St | 2,2'-Azobis-(2,4-dimethylvaleronitrile) |  |  |  |  |
| Com. Ex. 5 | MMA |  |  |  |  |  |
| Com. Ex. 6 | St/MMA |  |  |  |  |  |
| Com. Ex. 7 | St | Di-sec-butyl peroxydicarbonate |  |  |  |  |
| Com. Ex. 8 |  |  |  |  |  |  |

|  | pH of aqueous liquid | Conversion rate/% | Molecular weight: $M_p$ | $M_w/M_n$ | Molecular-weight controllability | Average particle diameter/μm |
|---|---|---|---|---|---|---|
| Example 1 | 8 to 9 | 90 | 10500 | 1.5 | A | 4.2 |
| Example 2 |  | 93 | 10700 | 1.4 | A | 3.5 |
| Example 3 |  | 91 | 10300 | 1.5 | A | 3.9 |
| Example 4 |  | 97 | 10200 | 1.4 | A | 4.4 |
| Example 5 |  | 98 | 10500 | 1.3 | A | 3.7 |
| Example 6 |  | 97 | 10100 | 1.5 | A | 4.0 |
| Ref. Ex. 1 |  | 93 | 10900 | 1.3 | — | — |
| Ref. Ex. 2 |  | 95 | 10500 | 1.4 | — | — |
| Ref. Ex. 3 |  | 92 | 10600 | 1.3 | — | — |
| Ref. Ex. 4 |  | 92 | 10200 | 1.4 | — | — |
| Ref. Ex. 5 |  | 93 | 10200 | 1.5 | — | — |

TABLE 1-continued

|         | Monomer | Conversion rate/% | Molecular weight: $M_p$ | $M_w/M_n$ | Molecular-weight controllability | Average particle diameter/μm |
|---------|---------|-------------------|------|-----------|--------|-----|
| Ref. Ex. 6 |      | 96 | 10600 | 1.4 | — | — |
| Com. Ex. 1 | 8 to 9 | 75 | 12100 | 1.4 | — | 4.0 |
| Com. Ex. 2 |      | 78 | 13200 | 1.5 | — | 3.2 |
| Com. Ex. 3 |      | 76 | 12800 | 1.4 | — | 3.7 |
| Com. Ex. 4 |      | 98 | 16300 | 1.6 | B | 4.5 |
| Com. Ex. 5 |      | 96 | 16900 | 1.5 | B | 3.5 |
| Com. Ex. 6 |      | 98 | 16600 | 1.5 | B | 4.2 |
| Com. Ex. 7 | 5    | 94 | 13400 | 1.6 | B | 5.2 |
| Com. Ex. 8 | 2    | —  | —     | —   | — | — |

(Note)
Ref. Ex.: Reference Example,
Com. Ex.: Comparative Example
St: Styrene,
MMA: Methyl methacrylate

TABLE 2

|           | Monomer | Polymerization initiator | Polymerization method | Synthesis step | Iodine-molecule reaction rate/% | Viscosity/ mPa·s |
|-----------|---------|--------------------------|-----------------------|----------------|---------------------------------|------------------|
| Example 1 | St | Di-sec-butyl peroxydicarbonate 2,2'-Azobis-(2,4-dimethylvaleronitrile) | Suspension polymerization | Performed | 82  | 1 |
| Example 7 |    |  |  |  | 100 | 2 |
| Example 4 |    |  |  |  | 86  | 1 |
| Example 8 |    |  |  |  | 33  |   |
| Example 9 |    |  |  |  | 100 | 2 |

|           | pH of aqueous liquid | Conversion rate/% | Molecular weight: $M_p$ | $M_w/M_n$ | Molecular-weight controllability | Average particle diameter/μm |
|-----------|----------------------|-------------------|-------------------------|-----------|----------------------------------|------------------------------|
| Example 1 | 8 to 9 | 90 | 10500 | 1.5 | A | 4.2 |
| Example 7 |        | 94 | 10600 | 1.3 | A | 4.3 |
| Example 4 |        | 97 | 10200 | 1.4 | A | 4.4 |
| Example 8 |        | 98 | 11200 | 1.4 | A | 3.8 |
| Example 9 |        | 95 | 10000 | 1.3 | A | 4.1 |

(Note)
St: Styrene

TABLE 3

|            | Monomer | Polymerization initiator | Polymerization method | Synthesis step | Iodine-molecule reaction rate/% | Viscosity/ mPa·s |
|------------|---------|--------------------------|-----------------------|----------------|---------------------------------|------------------|
| Example 9  | St | 2,2'-Azobis-(2,4-dimethylvaleronitrile) | Suspension polymerization | Performed | 100 | 2 |
| Example 10 |    |  |  |  |  | 10 |
| Example 11 |    |  |  |  |  | 25 |
| Example 12 |    |  |  |  |  | 50 |
| Com. Ex. 9 |    |  |  |  |  | 150 |

|            | pH of aqueous liquid | Conversion rate/% | Molecular weight: $M_p$ | $M_w/M_n$ | Molecular-weight controllability | Average particle diameter/μm |
|------------|----------------------|-------------------|-------------------------|-----------|----------------------------------|------------------------------|
| Example 9  | 8 to 9 | 95 | 10000 | 1.3 | A | 4.1 |
| Example 10 |        | 95 | 10500 | 1.3 | A | 3.8 |
| Example 11 |        | 96 | 10000 | 1.4 | A | 4.1 |
| Example 12 |        | 95 | 10200 | 1.4 | A | 4.5 |
| Com. Ex. 9 |        | —  | —     | —   | — | — |

(Note)
Com. Ex.: Comparative Example,
St: Styrene

The method for producing polymer particles according to an embodiment of the present invention can satisfactorily achieve both molecular-weight controllability and a high polymerization conversion rate. Accordingly, the method can be used for producing, for example, a polymerized toner or a functional binder contained in an ink-jet ink or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-078407 filed Mar. 31, 2011, No. 2011-093240 filed Apr. 19, 2011, and No. 2011-240454 filed Nov. 1, 2011, which are hereby incorporated by reference herein in their entirety.

What is claimed is:

1. A method for producing polymer particles, comprising:
   a step comprising preparing a first oily liquid by dissolving a radical polymerization initiator and an iodine molecule in an oily olefin monomer;
   a step comprising obtaining a second oily liquid by heating the first oily liquid to synthesize iodine compounds, wherein the second oily liquid has a viscosity of 50 mPa·s or less;
   a suspension step comprising suspending the second oily liquid in water; and
   a polymerization step comprising polymerizing the oily olefin monomer in the second oily liquid.

2. The method according to claim 1, wherein the second oily liquid contains at least the oily olefin monomer, the radical polymerization initiator, and the iodine compound.

3. The method according to claim 2, wherein the radical polymerization initiator is an oil-soluble radical polymerization initiator.

4. The method according to claim 1,
   wherein the radical polymerization initiator is an organic peroxide polymerization initiator, and
   a ratio of the amount of iodine molecule in the second oily liquid to the amount of iodine molecule in the first oily liquid is 0.8 or more.

5. The method according to claim 1,
   wherein the radical polymerization initiator is an azo polymerization initiator, and
   a ratio of the amount of iodine molecule in the second oily liquid to the amount of iodine molecule in the first oily liquid is 0.3 or more.

* * * * *